(No Model.)
V. MOHR.
CORN PLANTER.
No. 411,823. Patented Oct. 1, 1889.
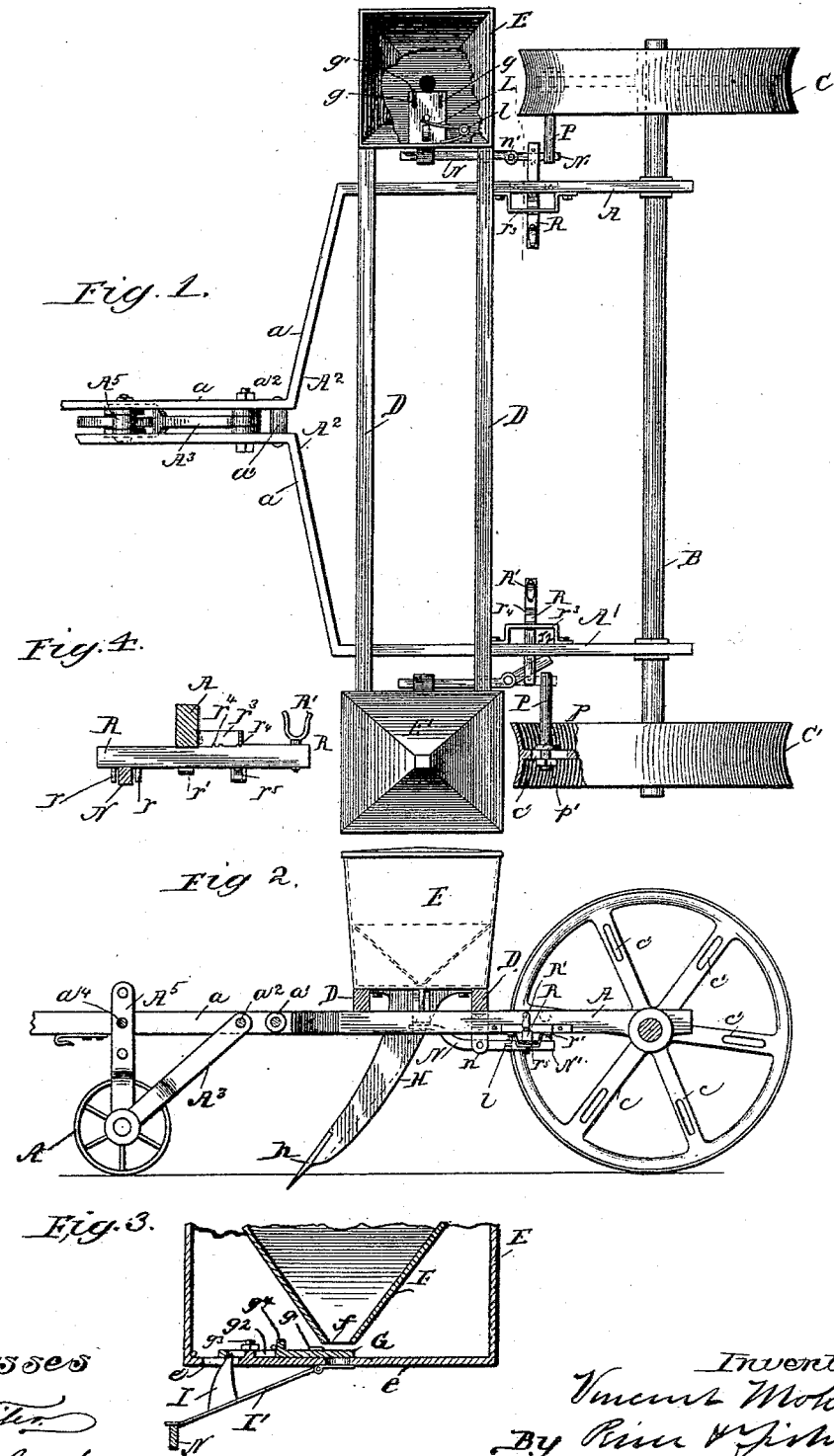

UNITED STATES PATENT OFFICE.

VINCENT MOHR, OF CHICAGO, ILLINOIS.

CORN-PLANTER.

SPECIFICATION forming part of Letters Patent No. 411,823, dated October 1, 1889.

Application filed March 12, 1888. Serial No. 266,972. (No model.)

*To all whom it may concern:*

Be it known that I, VINCENT MOHR, a citizen of the United States, residing at Chicago, in the county of Cook and State of Illinois, have invented certain new and useful Improvements in Corn-Planters, of which I do declare the following to be a full, clear, and exact description, reference being had to the accompanying drawings, forming part of this specification.

My present invention has relation, more particularly, to that class of corn-planters wherein the operation of the slides that control the dropping of the grain from the seed-boxes is effected through the medium of mechanism intermittently operated by the rotation of the main shaft or drive wheels of the machine.

My invention consists in the novel features of construction hereinafter described, illustrated in the accompanying drawings, and particularly pointed out in the claims at the end of this specification.

Figure 1 is a plan view of a corn-planter embodying my invention, parts being broken away for the purpose of better illustration. Fig. 2 is a view in side elevation. Fig. 3 is an enlarged detail view through the lower portion of one of the seed-boxes, the seed-slide, and adjacent parts. Fig. 4 is an enlarged detail view through the operating-lever and one of the side bars, said view being taken in front of the throw-off bar.

A and A' designate the side bars of the main frame of the machine, the rear ends of which bars will be sustained upon the axle B, that carries at its outer end the drive-wheels C and C'. The front portion $A^2$ of the main frame of the machine is preferably formed by the converging bars $a$, held separate by the block $a'$, and between the outer ends of these bars $a$ is pivotally sustained upon the bolt $a^2$ the swinging bar $A^3$, between the yoke-shaped end of which is journaled the gage-wheel $A^4$, and from the outer yoke-shaped end of this bar $A^3$ rises the adjusting-bar $A^5$, that is provided with a series of holes to receive a bolt $a^4$, that passes through the bars $a$. The purpose of thus mounting the gage-wheel $A^4$ is to enable the outer portion of the main frame of the machine to be lifted, so that the depth to which the shovels $h$ enter the ground can be readily adjusted or so that these shovels may be carried entirely above the ground when the machine is not in operation; and it is obvious that by changing the bolt $a^4$ to a higher or lower hole of the adjusting-bar $A^5$ the position of the shovels can be readily controlled.

Upon the side bars A and A' of the main frame are mounted the cross-bars D, upon the outer ends of which are sustained the seed-boxes E and E'. Each of these seed-boxes is preferably provided with an inner cone-shaped false bottom F, between the opening $f$ of which and the bottom $e$ of the main seed-box E is mounted the sliding plate G, which serves to control the discharge of grain from the seed-box into the spout H, that is suitably bolted to and extends from the bottom of the seed-box, and is provided at its lower end with a shovel $h$, of any usual or suitable construction.

The seed-slide G is preferably formed with slots $g$, that receive the guide-pins $g'$, affixed to the bottom $e$ of the main seed-box, and with a slot $g^2$, that receives the headed pin or bolt $g^3$, projecting from the bottom $e$ of the seed-slide, and serving to hold the seed-slide G in proper position with respect to the bottom of the box. In this slot $g^2$ of the seed-slide G also works the cam-bar I, that passes through a slot $e'$, formed in the bottom $e$ of the main seed-box, and is attached to the bar or plate I', that is suitably hinged or pivoted to the under side of the bottom of the seed-box.

From the construction, as thus far defined, it will be seen that when the pivoted bar or plate I' is forced in an upward direction it will cause the face of cam I to ride against the end of the slot $g^2$, formed in the seed-slide G, and hence will cause this slide to be moved backward a sufficient distance to permit the grain to fall through the opening $f$ in the conical bottom F of the seed-box into the discharge-spout H, whence it will pass into the ground behind the shovel $h$.

To the upper side of the bottom $e$ of the seed-box E is fixed, as at $l$, a spring L, one arm of which bears against a suitable stud $g^4$, that rises from the upper face of the seed-slide G, this spring serving to restore the seed-slide to a proper position for closing the discharge-opening $f$ of the seed-box. The upward movement of the pivoted bar I', that carries the cam I, which causes the backward movement of the seed-slide, is effected by means of the operating-lever N, that is pivotally sustained within a hammer $n$, attached to the cross-bar D near its outer end, this lever being preferably provided with an outer portion or end N', hinged thereto, as at $n'$, for a purpose to be presently stated. The movement of the lever N necessary to effect the lifting of the pivot-bar I' is effected by means of one or more trip-arms P, that project axially from the drive-wheels C. These arms P are preferably attached to the spokes $c$ of the drive-wheels, (if the wheels are formed with spokes,) the spokes being provided with slots $c'$, through which the threaded end or ends of the trip arm or arms P may be passed, the trip arm or arms being held in position by means of the shoulder and jam-nut $p$ and $p'$, respectively, upon the inner and outer sides of the spokes. From this construction it will be seen that when the operating-lever N with its extension N' are in the position shown at the right-hand side of the machine the extension N' will be struck by the trip-arm P as the main drive-wheel C is rotated; and it is obvious that when the extension N' of the lever N is thus struck the lever N will be vibrated in such manner as to cause its forward end to lift the pivot-bar I' and force the cam I to move the seed-slide G in backward direction, so as to uncover the discharge-opening $f$ of the main seed-box and permit the grain to fall into the spout H.

My purpose in forming the long slots $c'$ in the spokes of the main drive-wheels C is to permit the trip-arms P to be adjusted either toward or from the periphery of the wheel; and it is obvious that the length of time during which the seed-slide is held retracted or the extent of its backward movement will depend upon the extent to which the portion N' of the operating-lever N is depressed by means of the trip-arm P; hence by setting the trip-arm P either forward or backward upon the spokes of the main drive-wheel the amount of grain dropped at each movement of the seed-slide can be readily adjusted. This adjustable feature of the trip-arms I regard as of special importance, since it affords a very simple and effective means whereby the quantity of grain to be dropped can be readily determined. It is apparent that when by the rotation of the main drive-wheel C the trip-arm P has passed away from and released the end of the extension N' of the operating-lever N the spring L will force the seed-slide to close the discharge-opening of the seed-box and will cause the cam I and pivot-bar I' to move downward, and consequently will cause the operating-lever N to be restored to a proper position to be struck by the trip-arm as the drive-wheel continues to revolve. It will be readily understood that any number of trip-arms may be employed upon each of the drive-wheels C, the number being dependent upon the size of the wheels and upon the distance apart at which it is desired to plant the hills of grain.

As it frequently happens that it is desirable to use the planter for dropping but a single row of grain—as, for example, when finishing a field—and as it is at times necessary to throw the planting mechanism entirely out of operation, I have provided improved mechanism, next to be described, whereby the planting mechanism at either one or both sides of the machine may be quickly thrown out of operation. This mechanism in the construction shown comprises a suitable throw-off bar R, that is provided at its outer end with suitable pins $r$, to engage with the hinged end N' of the operating-lever N, and this throw-off bar is preferably sustained by means of a strap or hanger $r'$, affixed to the under side of the bar A of the frame, and by means of a similar strap $r^2$, attached to a bracket $r^3$, bolted to the side of the bar A.

In order to hold the throw-off bar at either its forward or backward position, it is preferably provided upon its upper face with the ratchet-teeth $r^4$, that are pressed normally into engagement with the strap $r^2$ by means of a spring $r^5$, that is fixed to the bracket $r^3$ beneath the throw-off bar. The outer end of the throw-off bar R will, by preference, be provided with a stirrup R', which will enable the operator to control by his foot the movement of the throw-off bar, it being understood, of course, that the operator will be provided with a suitable seat, in the usual manner, upon the center of the machine. From this construction it will be seen that when it is desired to throw the planting mechanism either into or out of operation it is only necessary for the operator to depress and draw backward the throw-off bar R, until the extension N' of the operating-lever N is retracted to the position shown at the left-hand side of Fig. 1 of the drawings.

While I have described in the foregoing specification what I regard as the preferred embodiment of my invention, it will be readily understood that the details of construction above set out may be varied without departing from the spirit of my invention. Thus, for example, it is obvious that my improved mechanism for operating the seed-slide can be used where other means than a trip-arm are employed for controlling its movements, and so, also, the trip-arm can be used in connection with other forms of seed-slides or plates, and the operating-lever and throw-off mechanism can plainly be used with advantage whether the movement of this bar is effected by trip-arms on the main drive-wheel or by other suitable devices. So, also, the form or arrangement of the operating-lever can be varied or an equivalent device substituted therefor to co-operate with the trip-arms or equivalent devices for controlling the movement of the seed-slides without departing from my invention, and in like manner the trip-arms may be attached to a supplemental drive-wheel on the main shaft instead of to the carrying-wheels shown.

By my improved mechanism it will be seen that the two mechanisms at either side of the planter can be operated either in conjunction with or totally independent of the mechanism at the opposite side, the advantage of which operation is obvious.

Having thus described my invention, what I claim is—

1. In a corn-planter, the combination, with a seed-box, of a slotted feed-slide, a cam working in the slot of said feed-slide, and a pivot-bar whereon said cam is mounted, and an operating-lever for moving said pivot-bar, substantially as described.

2. In a corn-planter having provision for one or more seed-boxes, the combination, with a seed-box having a seed-slide, of a vertically-vibrating lever, a cam operated by the lever for moving the slide, and a drive-wheel provided with trip-arms for vibrating the lever, substantially as described.

3. In a corn-planter having provision for one or more seed-boxes, the combination, with a seed-box having a seed-slide, of a vertically-vibrating lever for operating the slide formed with a laterally-movable hinged portion, and a drive-wheel provided with trip-arms for engaging the hinged portion of the lever, whereby the same is vibrated, substantially as described.

VINCENT MOHR.

Witnesses:
GEO. P. FISHER, Jr.,
I. B. CARPENTER.